(12) United States Patent
Hilt et al.

(10) Patent No.: US 7,904,902 B2
(45) Date of Patent: Mar. 8, 2011

(54) CLIENT-SERVER BIDIRECTIONAL SYNCHRONIZATION VIA BROWSER PLUG IN FOR AN XM RADIO SYSTEM

(75) Inventors: Patrick Hilt, San Diego, CA (US); Marc Abrahams, San Diego, CA (US)

(73) Assignees: Sony Corporation, Tokyo (JP); Sony Electronics Inc., Park Ridge, NY (US)

( * ) Notice: Subject to any disclaimer, the term of this patent is extended or adjusted under 35 U.S.C. 154(b) by 1079 days.

(21) Appl. No.: 11/657,365

(22) Filed: Jan. 24, 2007

(65) Prior Publication Data
US 2007/0118833 A1   May 24, 2007

Related U.S. Application Data

(63) Continuation of application No. 09/944,655, filed on Aug. 31, 2001, now Pat. No. 7,210,142.

(51) Int. Cl.
G06F 9/445   (2006.01)
G06F 9/44    (2006.01)

(52) U.S. Cl. .......................... 717/178; 717/177; 709/203

(58) Field of Classification Search .......... 717/174–178; 709/203–204
See application file for complete search history.

(56) References Cited

U.S. PATENT DOCUMENTS

| | | | | |
|---|---|---|---|---|
| 5,845,078 | A * | 12/1998 | Tezuka et al. | 709/222 |
| 6,023,586 | A * | 2/2000 | Gaisford et al. | 717/178 |
| 6,195,680 | B1 * | 2/2001 | Goldszmidt et al. | 709/203 |
| 6,594,819 | B1 * | 7/2003 | Ciarlante et al. | 717/177 |
| 6,799,201 | B1 * | 9/2004 | Lee et al. | 709/217 |
| 7,010,263 | B1 * | 3/2006 | Patsiokas | 455/3.02 |
| 7,177,589 | B1 * | 2/2007 | Lynch | 455/3.04 |
| 7,210,142 | B2 * | 4/2007 | Hilt et al. | 717/172 |
| 7,353,511 | B1 * | 4/2008 | Ziese | 717/178 |
| 7,353,512 | B2 * | 4/2008 | Katz et al. | 717/178 |
| 7,379,997 | B2 * | 5/2008 | Ehlers et al. | 709/224 |
| 7,426,637 | B2 * | 9/2008 | Risan et al. | 713/165 |
| 7,493,362 | B2 * | 2/2009 | Bogatin et al. | 709/203 |
| 7,536,686 | B2 * | 5/2009 | Tan et al. | 717/174 |
| 7,584,353 | B2 * | 9/2009 | Risan et al. | 713/164 |
| 7,624,417 | B2 * | 11/2009 | Dua | 725/114 |
| 7,634,772 | B2 * | 12/2009 | Parthasarathy et al. | 717/178 |
| 7,730,484 | B2 * | 6/2010 | von Tetzchner | 717/178 |
| 7,770,167 | B1 * | 8/2010 | Weathersby | 717/174 |
| 7,814,483 | B2 * | 10/2010 | Li et al. | 717/177 |

OTHER PUBLICATIONS

Milojevic et al, "Channel state modeling for single and multiple satellite bradcasting systems", IEEE, pp. 102-106, 2008.*
Dipierro et al, "Sirius XM satellite radio system overview and services", IEEE, pp. 506-511, 2010.*
Burns et al, "XM SKYFi searching for extreme usablity", ACM DPPI, pp. 73-76, 2003.* Wang et al, "Dynamically optimized spatiotemporal prioritization for spectrum sensing in cooperative cognitive radio", Springer, wireless netw, 16:889-901, 2010.*

* cited by examiner

Primary Examiner — Anil Khatri
(74) Attorney, Agent, or Firm — John L. Rogitz

(57) ABSTRACT

An XM radio system, a browser plug-in for bidirectional communication in the XM radio system, and method for bidirectional communication between an XM radio receiver, a first computing device and a second computing device is provided. The XM radio system includes an XM radio receiver communicatively connected to a first computing device, a second computing device communicatively connected to the first computing device and a computer program stored on the first computing device. Unresolved bookmarks are transferred from the first computing device to second computing device via the Internet and the resolved bookmarks are bidirectionally communicated from the second computing device to the first computing device via Internet and does not trigger a fire wall.

5 Claims, 3 Drawing Sheets

CLIENT-SERVER BIDIRECTIONAL SYNCHRONIZATION VIA BROWSER PLUG IN FOR AN XM RADIO SYSTEM

This application is a continuation of and claims priority to U.S. patent application Ser. No. 09/944,655, filed Aug. 31, 2001, now U.S. Pat. No. 7,210,142. This application incorporates by reference U.S. patent application Ser. No. 09/945,583, filed Aug. 31, 2001, now U.S. Pat. No. 7,660,875.

This application incorporates herein by reference patent application Ser. No. 09/945,583, filed Aug. 31, 2001, by Hilt, et al, entitled BIDIRECTIONAL REMOTE COMMUNICATION VIA BROWSER PLUG-IN.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to communication between a client application and a remote device in a network environment having security restrictions, and more particularly, to a system for providing information sent with digital audio signals from an auxiliary source to a radio receiver, particularly, a vehicle radio receiver.

The invention further relates to a system method and computer program which allows bidirectional device communication through and around fire walls when a dedicated communication port is utilized.

BACKGROUND OF THE INVENTION

XM radio receivers will deliver up to 100 channels of crystal-clear, digital-quality music, news and information to users in their homes, cars and other listening environments. However, allowing a user to retrieve desired information by searching through a database can prove to be confusing and problematic. For example, how does the user insure that the music or information he was listening to is correctly determined from the data stored in the database? Also, the access to and completeness of the data should allow the user to easily browse and search for the information that is needed.

Over the years, however, the Internet and the World Wide Web (WWW) have grown and their utilization has increased from a simple method of communication into a medium for storage, interactive accessing of information, and enablement of remote device control. The Internet and the WWW have captured the public's imagination as the so called "Information Super Highway". Accessing information through the web has been used by the metaphorical term "surfing the web".

However, the Internet is not a single network, nor does it have any single owner or controller. Rather, the Internet is a network of networks, both public and private, connected to each other. The resulting network utilizes security measures, such as fire walls, to prevent the spread of computer viruses, as well as the unauthorized access to account files and data. Given the proliferation of Internet viruses and web hackers, the utilization of security restrictions, such as fire walls, and other security measures in public and private networks remains in place and in the foreseeable future will necessarily continue to grow.

The WWW facilitates users interactive access to information, storage and remote control of devices by letting users or clients jump from one server or network to another, simply by selection of a word, picture, or program. In fact, when exploring the web today, a user navigates the web through the utilization of a "web browser". There are many number of browsers presently in existence. Common examples of browsers include, Netscape's "Navigator", Microsoft's "Explorer", Mosiac's browser, and IBM's "Web Explorer". A web browser allows a client access to servers and networks located throughout the world for storage, information, and remote device control. The information is provided to a client by the remote server by sending files or data packets to the requesting clients computer. However, with the use of fire walls and other security measures, the files or data packets sent by a remote server to a client's computer are blocked and not allowed access.

SUMMARY OF THE INVENTION

In view of the foregoing, an XM radio system is provided which allows for book-marking of music, news and information and further allows for the searching of an internet database by utilization of bookmarks. browser plug-in is provided for true bidirectional communication, information transfer and relay and remote device control.

In particular, the XM radio system utilizes a browser plug-in for bidirectional communication. In one embodiment, the browser plug-in is included on a client computer, and has a communication relationship with an application connected to any and every device which is connected to the client computer. Also, the browser plug-in allows for bidirectional communication with a remote server via the internet. A method of one embodiment includes supplying the browser plug-in to any computing device having network capabilities, communicatively connecting an XM radio receiver to the client computer, uploading unresolved bookmarks to the client computer and utilizing the browser plug-in to upload/download the unresolved bookmarks from the client computer to the server and to download resolved bookmarks from the server to the browser via the browser plug-in. In a further embodiment, the browser plug-in may be located on the XM radio receiver itself, given that the receiver has network capabilities.

These and other features and advantages of the invention will be understood upon the consideration of the following detailed description of the invention and accompanying drawings. The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

The following detailed description, given by way of example, and not intended to limit the present invention solely thereto, will best be understood in conjunction with the accompanying drawings in which:

FIG. 3 is flow diagram of FIG. 2 which shows one embodiment of the communication steps between the client computer and a server via the browser plug-in.

DETAILED DESCRIPTION OF THE INVENTION

Figure 1:
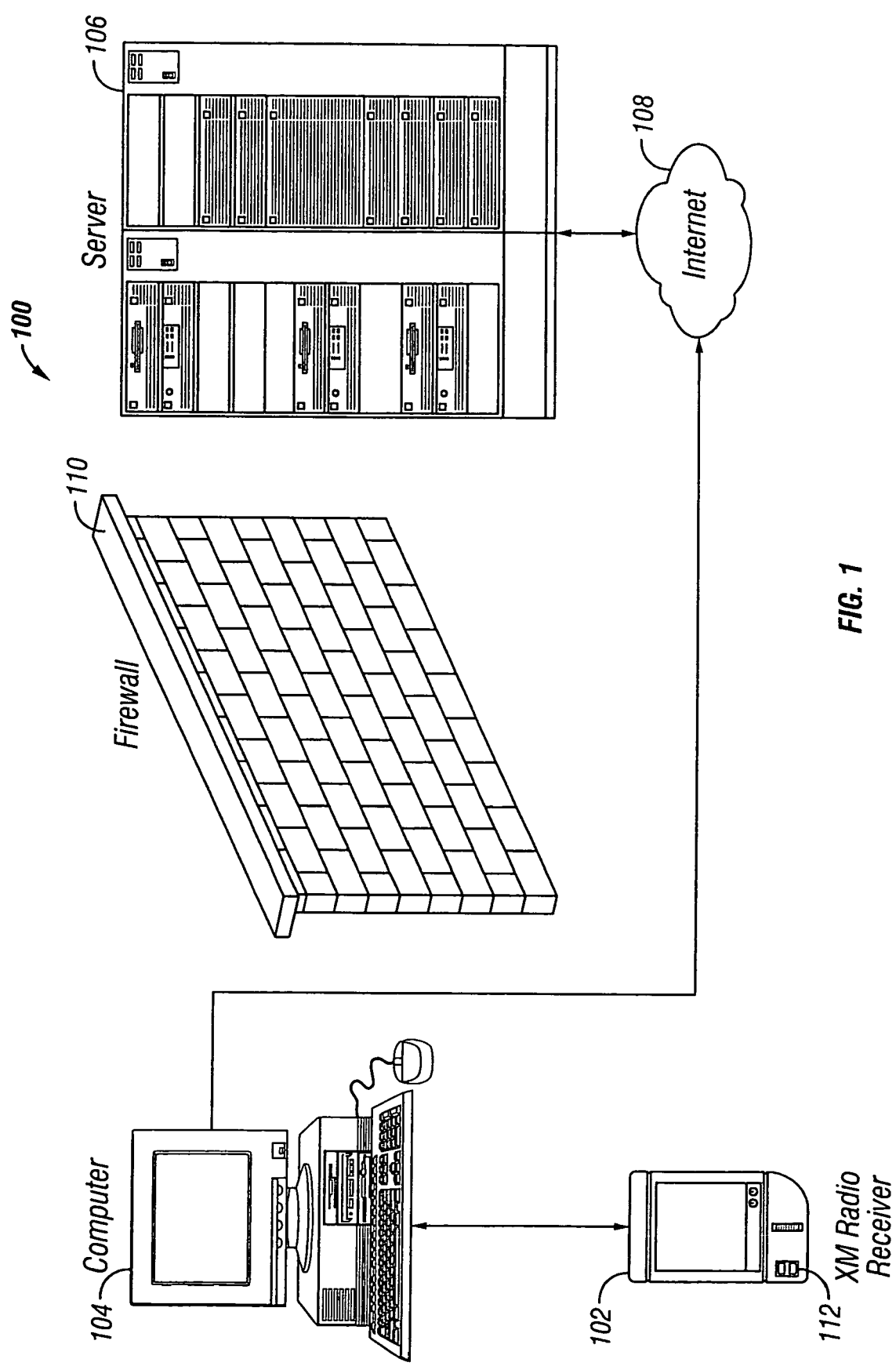
FIG. 1 illustrates one embodiment in which an XM radio receiver is communicatively connected to a client computer and the client computer is communicatively connected to, and navigates around a fire wall, a server via the Internet.

FIG. 1 illustrates an XM radio bidirectional communications system 100. XM radio bidirectional communications system 100 includes an XM radio receiver 102, which is communicatively connected to a first computing device 104. XM radio bidirectional communications system 100 also includes a second computing device 106, which is communicatively connected to first computing device 104 via the Internet 108. A fire wall 110 is a computer program installed on first computing device 104 which comprises protocols for the interaction of first computing device 104 and second computing device 106. Fire wall 110 is a security measure which prevents computer viruses and hackers from access to the computer files on first computing device 104 and information stored within XM radio receiver 102.

In one embodiment, XM radio receiver 102 may be configured to communicatively connected to first computing device 104 by utilizing a USB port. In an alternative embodiment, the interface protocol defined in IEEE 1394 may be used. As another alternative embodiment, RS-232C may be used as an interface for communication. However, the communication is not limited to wire communication, and communication between XM radio receiver 102 and first computing device 104 may be performed wirelessly using, for example but not limited to, radio frequency carriers such as 802.11B or BLUETOOTH, and/or infrared ray signals using an interface protocol based on IRDA (Infrared Data Association).

In operation, XM radio receiver 102 receives a broadcast which contains service information. The service information further contains product ID or bookmarks. The service information contains sixteen (16) bytes of data which comprises the artist name, song name, and some other possible identifier information. The bookmarks are numeric data which uniquely identifies the song or broadcast. When listening to XM radio receiver 102 and hearing music, news, or other information that a user would like further information on, depressing a bookmark button 112 records some portion of the service information which contains the bookmark and/or a first set of data.

Figure 2:
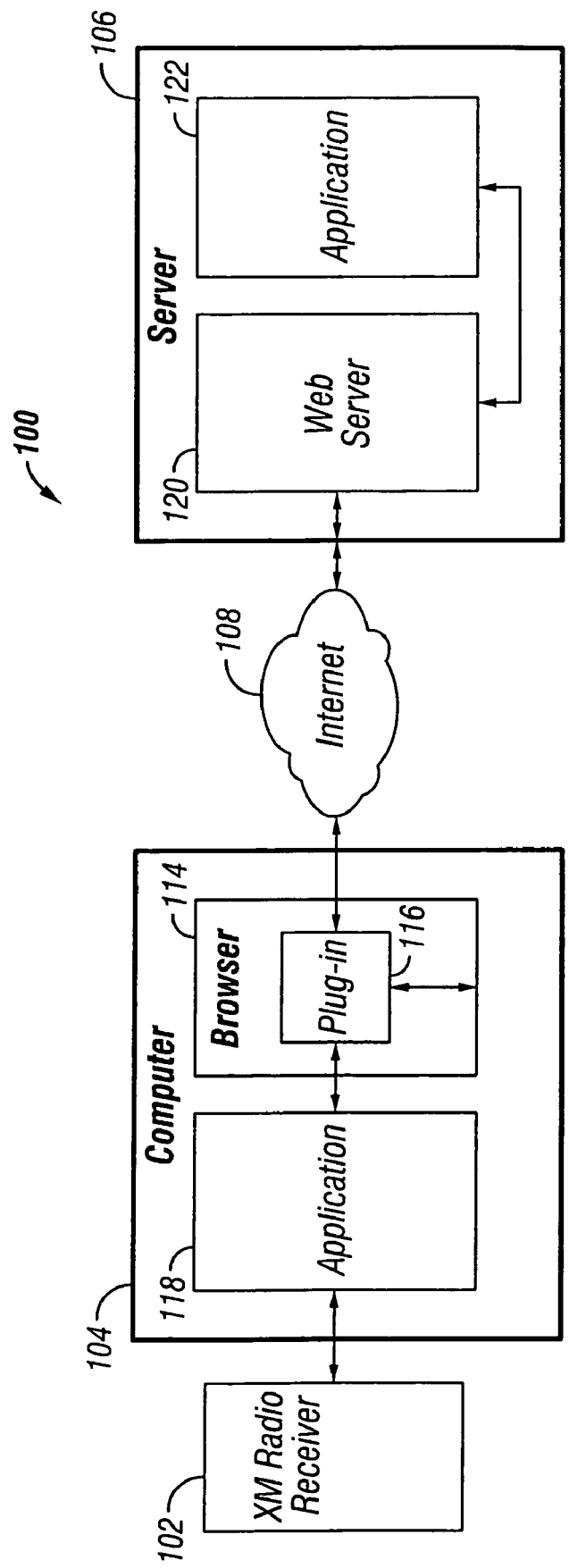
FIG. 2 is a block diagram of FIG. 1, which shows the browser plug-in operating in true bidirectional capacity in the software environment.

FIG. 2 further illustrates the elements of XM radio bidirectional communications system 100 by way of a block diagram. In one embodiment, first computing device 104 is a client computer comprising a browser 114. A browser plug-in 116 and a client application program 118 are supplied to client computer 104. Browser plug-in 116 is communicatively connected to client application program 118. Browser plug-in 116 is also communicatively connected to browser 114. In an alternative embodiment, browser plug-in 116, as well browser 114 and client application program 118 could have easily been installed on XM radio receiver 102. Second computing device 106 also includes a network computer program 120 communicatively connected to a server application program 122. In one embodiment, second computing device 106 is a server which is communicatively connected to computer 104 via data communication between network computer program 120 and browser plug-in 116 via internet connection 108.

In operation, the connection of XM radio receiver 102 triggers the launch of client application program 118 which in turn triggers the launch of browser plug-in 116. Browser plug-in 116 launches browser 114 and directs browser 114 to establish electronic communication with server 106 via internet connection 108. Client application program 118 supplies browser plug-in 116 with the uniform resource locator (URL) of server 106. Client application 118 then uploads unresolved bookmarks from said XM radio receiver 102 to server 106 via browser plug-in 116 and internet connection 108. Server 106 then processes the unresolved bookmarks and arrives at the resolved bookmarks. Server 106 then utilizes browser plug-in 116 to direct browser 114 to the resolved bookmarks at a particular internet address utilizing URLs supplied to browser 114 by server 106. The utilization of these URLs supplied to browser 114 by server 106, via browser plug-in 116, mimics the control of browser 114 by a user and thus prevents the triggering of firewall 110 (see FIG. 1). In this way, server 106 downloads the resolved bookmarks to computer 104 without triggering firewall 110.

Figure 3:
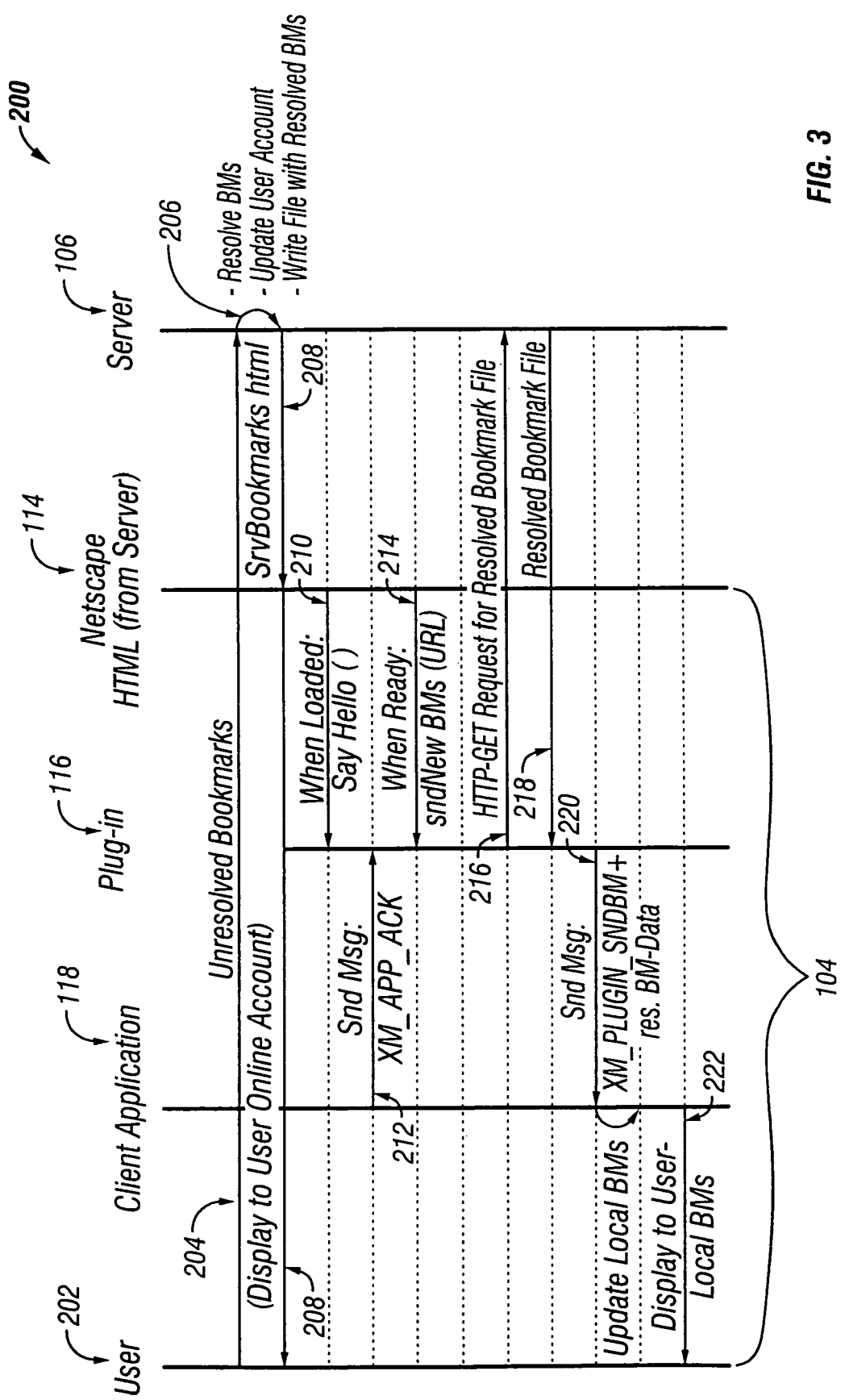

FIG. 3 illustrates one embodiment of the communication steps 200 between computer 104 and server 106 via browser plug-in 116. Computer 104 comprises a user 202, client application 118, browser plug-in 116, and browser 114. The unresolved bookmarks are uploaded to server 106 by way of uploading step 204. The unresolved bookmarks are incomplete and/or contain unresolved data. Server 106 resolves the unresolved bookmarks by providing complete and/or resolved bookmarks and writes a file with the resolved bookmarks by way of resolution step 206. In one embodiment, browser 114 is a Netscape browser. Server 106 then transmits the resolved bookmarks as a formatted HTML page to browser 114 and displays the account of user 202 by transmission step 208.

Browser 114 then communicates to browser plug-in 116 to begin the download process of the resolved bookmarks by way of step 210. Browser plug-in 116 then communicates to client application 118. Client application 118 then sends an acknowledgment back to browser plug-in 116 by step 212 acknowledging the beginning of the download process of the resolved bookmarks. Browser 114 then transmits a URL to browser plug-in 116. The URL was transmitted from server 106 to browser plug-in 116 via the formatted HTML page transmitted in step 208. Browser plug-in 116 thus utilizes the URL to direct browser 114 to an internet address where the resolved bookmarks are filed, stored, and ready to be downloaded by way of request step 216. The resolved bookmark file is thus sent to computer 104 and an instruction is sent to browser plug-in 116 by download step 218. Browser plug-in 116 then transmits a message to client application 118 which acknowledges the sending of the resolved bookmark file to complete the download process by download completion step 220. Client application 118 thus updates the locally stored bookmarks with the resolved bookmarks and displays this data to user 202 by step 222. Browser plug-in 116 thus has access to all the files and data on computer 104, and when connected via the Internet 108 to server 106, allows for bidirectional communication which does not trigger firewall 110.

Various other modifications and alterations in the structure and method of operation of this invention will be apparent to those skilled in the art, without departing from the scope and spirit of the invention. Although the invention has been described in connection with specified preferred embodiments, it should be understood that the invention as claimed should not be unduly limited to such specific embodiments. It is intended that the following claims describe the scope of the present invention and that the structures and methods within the scope of these claims and their equivalents be covered thereby.

What is claimed is:

1. A system, comprising:
   at least one client device application;
   at least one XM radio associated with the client device application and receiving service information related to an XM radio broadcast;
   at least one user input device for generating a signal representing the service information;
   at least one browser associated with the client device application for sending at least portions of the service information to a server computer over the Internet;
   at least one client browser portion associated with the client device application and accessing at least an identification of an Internet site at which information correlated to the service information can be accessed, the browser portion using the identification of an Internet site to cause the browser to retrieve the information correlated to the service information.

2. The system of claim 1, wherein the client device is configured with a firewall, and the browser portion is configured such that the information correlated to the service information is retrieved without triggering the firewall.

3. The system of claim 2, wherein the service information contains at least one of: product identification, artist name, song name, broadcast name.

4. The system of claim 1, wherein the identification of an Internet site is received from the client device application.

5. The system of claim 1, comprising a server computer communicating with the client device application over the Internet and generating the information correlated to the service information.

* * * * *